United States Patent [19]

Griffin

[11] 3,815,035

[45] June 4, 1974

[54] TAPE SPEED COMPENSATION CIRCUIT

[75] Inventor: John H. Griffin, Racine, Wis.

[73] Assignee: Marquette Electronics, Inc., Milwaukee, Wis.

[22] Filed: July 18, 1972

[21] Appl. No.: 272,770

Related U.S. Application Data

[63] Continuation-in-part of Ser. No. 265,266, June 22, 1972, abandoned.

[52] U.S. Cl. .......... 329/136, 179/100.2 K, 307/233, 307/247 R, 329/103, 329/122

[51] Int. Cl. ........................ H03c 3/06, G11b 15/04

[58] Field of Search .................... 329/122, 136, 103; 307/247 R, 233; 179/100.2 K, 100.2 S

[56] References Cited

UNITED STATES PATENTS

| | | | |
|---|---|---|---|
| 3,158,845 | 11/1964 | Bengston | 179/100.2 K X |
| 3,253,237 | 5/1966 | Runyan | 179/100.2 S X |
| 3,339,192 | 8/1967 | Zeller et al. | 179/100.2 S X |
| 3,488,452 | 1/1970 | Gunning et al. | 179/100.2 S |
| 3,528,036 | 9/1970 | Belleson | 307/247 X |
| 3,578,988 | 5/1971 | Slowikowski | 307/247 R |
| 3,705,353 | 12/1972 | Randoing | 179/100.2 S |
| 3,711,729 | 1/1973 | Quiogue | 307/247 S |

*Primary Examiner*—Alfred L. Brody
*Attorney, Agent, or Firm*—Andrus, Sceales, Starke and Sawall

[57] ABSTRACT

A demodulator of the one shot multivibrator type includes means for altering the operative period of the one shot multivibrator so as to compensate for flutter effects associated with a frequency modulated data signal. The means includes a current source for charging a capacitor controlling the operative period of the one shot multivibrator in accordance with a signal corresponding to flutter effects to provide the desired compensation.

7 Claims, 9 Drawing Figures

TAPE SPEED COMPENSATION CIRCUIT

CROSS REFERENCE TO RELATED APPLICATION

This application is a continuation in part application of co-pending U.S. Pat. application Ser. No. 265,266, filed June 22, 1972, now abandoned.

BACKGROUND OF THE INVENTION

1. Field of the Invention

The present invention relates to circuitry suitable for use in data reproducing devices employing a moving magnetic recording medium. The circuitry provides compensation to the reproduced data signal for speed variations of the moving magnetic medium.

2. Description of the Prior Art

Common electro-magnetic recording devices pass a magnetic recording medium, such as a magnetic tape, across a stationary recording head to record a signal containing data in the form of frequency modulation characteristics on the tape. The tape is moved by a mechanical means, such as a capstan drive. The inevitable variations in tape speed caused by operation of the mechanical drive elements create corresponding effects in the recorded data. These effects are commonly termed flutter.

During playback of the recorded data, the tape is moved by the mechanical drive means past a playback head. The reproduced data thus contains flutter effects introduced during both the recording process and the playback process. The effects so introduced may be indistinguishable from the recorded data.

While in some applications such effects may go unperceived or may be lessened by mechanical devices, such as fly wheels, in other applications, the effects of flutter must be compensated for and mechanical means are inadequate. Typical of such applications is the recording of electrocardiographic data in analog form. Such recording must be of a very high quality to faithfully reproduce the electrical phenomena associated with the physiological functioning of the heart.

There have thus been devised techniques for ascertaining the speed variations in the tape and providing compensation to the recorded data during the playback process so that the reproduced data resembles that originally recorded. These techniques are commonly termed tape speed compensation.

One such compensating technique utilizes two recording tracks. During recording, the recording head for one track, termed the reference track, generates a signal of constant frequency, for example, 800 hertz. The recording head for the second track, termed the data track, simultaneously generates the frequency modulated data signal. During playback the recorded constant frequency reference signal is utilized to obtain a tape speed error signal which is used to provide restorative playback compensation to the data signal.

Because flutter variations are percentage type changes and because with frequency modulation of the data signal, its frequency is constantly varying, a simple additive-subtractive type of compensation is not sufficient. For example, a 10 percent change in tape speed might produce an 80 hertz error signal from an 800 hertz tape speed compensating signal. However, if the frequency in the data recording track is 900 hertz, a variation of 90 hertz will be produced. The 80 hertz tape speed compensation error signal is arithmetically incapable of compensating for the 90 hertz data error signal.

The error signal has therefore been used to alter the operation of a one shot multivibrator in the demodulator which detects the intelligence data on the frequency modulated carrier and provides the data signal. This demodulation is obtained by employing the cyclic nature of the frequency modulated data signal to trigger a one shot multivibrator having a constant period of operation. Variations in the frequency of the data signal will alter the timing of the triggering of the multivibrator and the relationship between its operative and inoperative periods. The tape speed compensating error signal is used to overcome the alterations produced by flutter and restore the relationship of the operative and inoperative periods to that which would exist without flutter. Tape speed compensation is thus obtained.

In the past, this compensation has been provided on a voltage basis. That is, a voltage signal derived from the reference signal operated tape speed compensation circuit is utilized to provide voltage compensation to the one shot multivibrator. However, by analysis it can be shown that the relationship between flutter and circuit voltages is non-linear. This prevents completely satisfactory compensation. As long as the magnitude of the flutter is low, the effects of non-linearity may not be greatly significant. However, as the magnitude of flutter increases, compensation becomes increasingly poorer. For high quality reproduction fully adequate compensation for all levels of flutter should be provided.

SUMMARY OF THE PRESENT INVENTION

It is therefore, the object of the present invention to provide an improved tape speed compensation circuit. More specifically, it is the object of the present invention to provide a tape speed compensation circuit of the multivibrator type in which compensation is provided from a current source, thereby to overcome the effects of non-linearity present in prior art tape speed compensation circuits utilizing a voltage basis.

The circuitry of the present invention includes a one shot multivibrator triggered by the data signal into cycles having operative and inoperative periods. The relationship between these periods serves to demodulate the data signal and this relationship is changed by flutter effects unless compensation is provided. The relative magnitude of one of the periods is determined by the charging rate of a capacitor in the multivibrator. In accordance with the present invention a current source is coupled to the capacitor for supplying a charge rate altering current to the capacitor in accordance with a flutter effect signal. The magnitude of the current is determined by the application of a differential voltage, produced by a fixed voltage existing in the current source and a flutter effect voltage signal, to a resistive means in the current source.

DESCRIPTION OF THE PREFERRED EMBODIMENT

Figure 1:
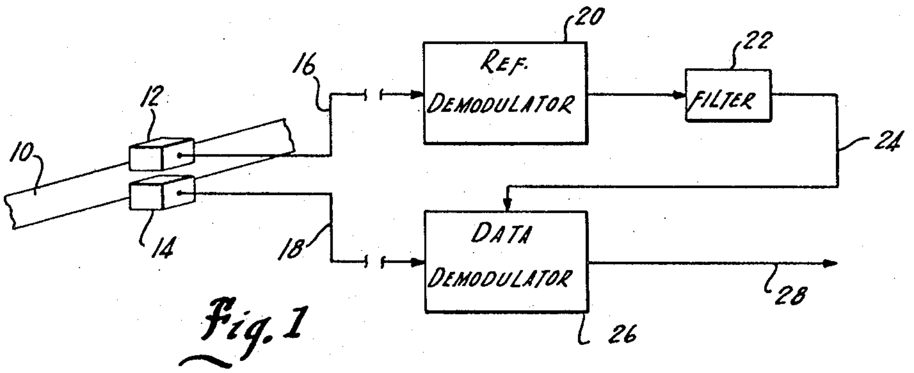
FIG. 1 is a block diagram showing generally the elements of a tape speed compensation means for an electro-magnetic recording device.

Turning now to FIG. 1, there is shown therein in block diagram form, circuitry utilized to provide tape speed compensation. The tape speed compensation reference signal and the frequency modulated data signal have previously been recorded on tape 10, the mechanical movement of which past the recording heads and past reference playback head 12 and data playback head 14 introduces flutter effects in the reproduction of these signals in conductors 16 and 18, respectively.

The output of reference playback head 12 in conductor 16 comprises a signal, the frequency of which is the constant frequency reference signal as altered by flutter effects. The signal in conductor 16 is applied to reference demodulator 20. Reference demodulator 20 includes a constant operative period, one shot multivibrator triggered by the signal in conductor 16. The relationship between the operative and inoperative periods of the multivibrator is used to ascertain any deviation from constant tape speed recording and playback conditions. Demodulator 20, through filter 22, provides an output signal in conductor 24 corresponding to such deviation.

The output of data playback head 14 in conductor 18 comprises a frequency modulated data signal as altered by flutter effects. The signal is applied to data demodulator 26 which removes the carrier. Without tape speed compensation, the output of data demodulator 26 in conductor 28 would comprise the data plus flutter effects. The tape speed compensation signal in conductor 24 is therefore applied to data demodulator 26 to alter its operation so that the output signal of the demodulator in conductor 28 comprises only the data.

Figure 2:
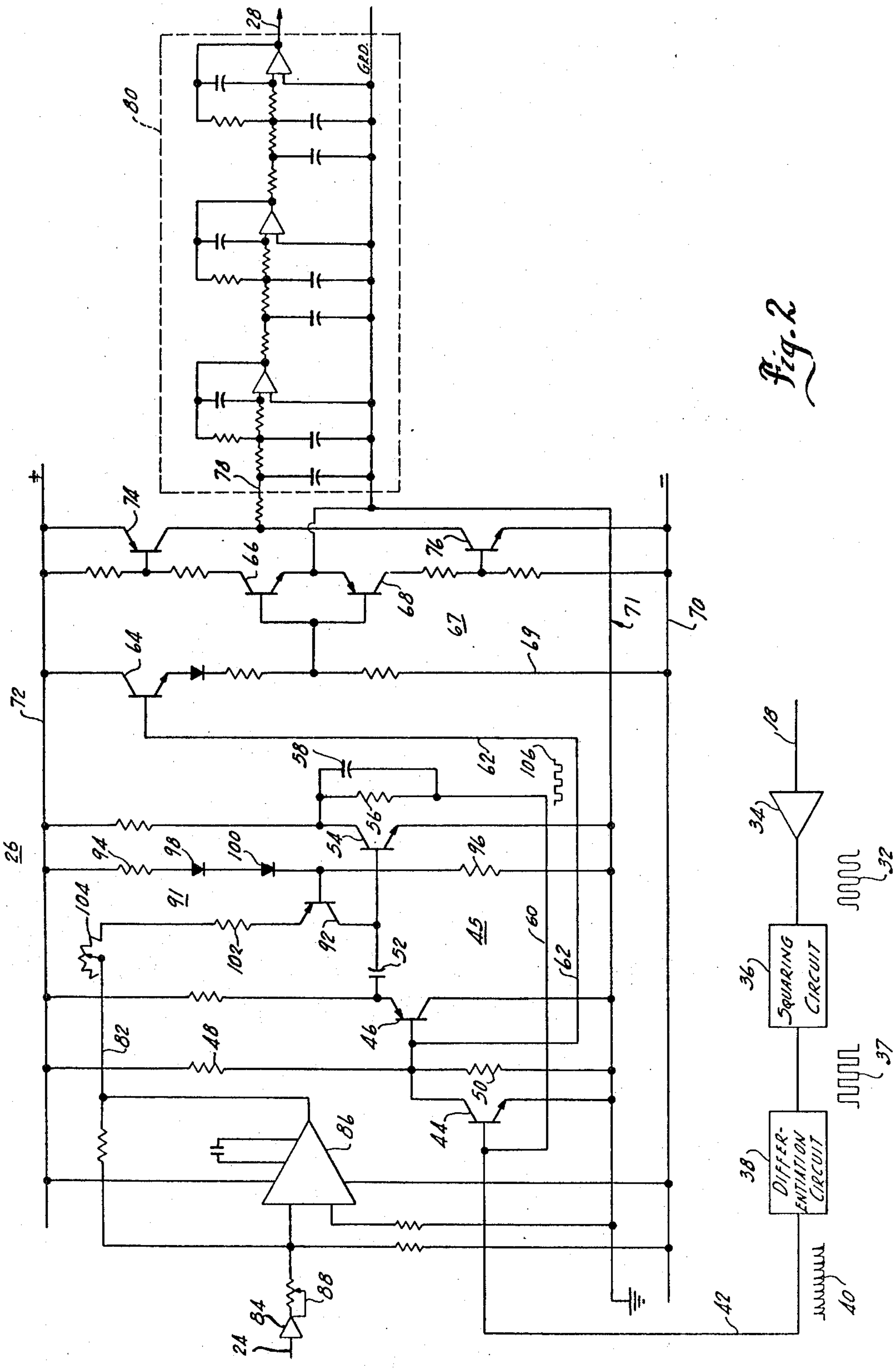
FIG. 2 is a detailed schematic diagram of the tape speed compensation circuit of the present invention.

The manner in which this is done may be seen by reference to FIG. 2 which comprises detailed circuit diagram of the tape speed compensating circuit of the present invention.

Conductor 18 containing the frequency modulated data signal 32 is connected to input amplifier 34. The output of amplifier 34 is connected to a squaring circuit 36 which provides a square wave signal 37 corresponding to the frequency modulated data input signal 32. A differentiation circuit 38 responsive to the abrupt changes in the square wave signal 37 provides a spike pulse train 40 in conductor 42. The frequency of this pulse train is twice the frequency of the input signal in conductor 18 as hereinafter described in connection with FIG. 3.

This pulse train is supplied to the base terminal of transistor 44 comprising an element of one shot multivibrator 45 of data demodulator 26. The collector of transistor 44 is connected to the base of transistor 46. The base of transistor 46 is also biased by a voltage divider comprised of resistor 48 and resistor 50. The emitter of transistor 46 is connected through capacitor 52 to the base of transistor 54. The signal at the collector of transistor 54 is provided through an R-C circuit comprised of resistor 56 and capacitor 58 to conductor 60 and the base of transistor 44. The output signal of one shot multivibrator 45 is taken in conductor 62 from the base of transistor 46.

The output of one shot multivibrator 45 in conductor 62 is provided to push-pull driver 67 having input transistor 64. The emitter of transistor 64 is connected to the base of complementary paired transistor drivers comprising NPN transistor 66 and PNP transistor 68. The emitter of transistor 64 is also connected through conductor 69 to power bus 70 containing negative voltage −E. The collector of transistor 64 is connected to power bus 72 containing positive voltage +E. The collector of transistor 66 is connected to the base of output transistor 74 while the collector of transistor 68 is connected to the base of output transistor 76. The emitter of transistor 74 is connected to positive voltage power bus 72. The emitter of transistor 76 is connected to negative voltage power bus 70. The collectors of the transistors are connected to output conductor 78. The signal in conductor 78 is filtered by filter 80 to provide the demodulated signal in conductor 28. Filter 80 may comprise a three stage Bessel polynomial filter, each stage of which comprises an operational amplifier having an associated R-C filtering network.

The tape speed compensation signal in conductor 24 is provided to data demodulator 26 in conductor 82 through one or more stages of amplification 84-86 including gain potentiometer 88. The tape speed compensation signal is utilized to alter the charging rate of capacitor 52 in the one shot multivibrator and hence its operating period. In accordance with the present invention, the signal is provided to current source 91 to effect capacitor charging rate alteration.

Current source 91 includes transistor 92. The base of transistor 92 is connected to a voltage divider comprised of resistor 94 and resistor 96 so that the voltage at the base of the transistor is determined by the magnitude of these resistors. Diodes 98 and 100 provide temperature compensation to the voltage divider to assist in maintaining the voltage at the base of transistor 92 constant. The collector of transistor 92 is connected to capacitor 52. The emitter of transistor 92 is connected to resistor 102 and potentiometer 104 located in conductor 82. The aforesaid circuitry derives its current source characteristics from the fact that the current at the collector of transistor 92 is determined by voltage differences in the current source and is independent of conditions existing in the circuit load, that is, capacitor 52. Specifically, the emitter-collector current of transistor 92 is determined by the voltage difference between the voltage in conductor 82 at the output of amplifier 86 and the voltage at the base of transistor 92 and the resistance of the resistive means comprised of resistor 102 and potentiometer 104. Transistor 92 in addition to applying the fixed voltage to one end of resistor 102 necessary to permit the signal in conductor 82 to control the magnitude of the current of current source 91, also provides the high impedance characteristics typical of such a source. The magnitude of the current from current source 91 determines the charging rate of capacitor 52 and the operative period of one shot multivibrator 45.

In the absence of a data signal and flutter effects in the signal in conductor 18, the operation of the circuitry is as follows. Under such conditions, the signal in conductor 18 is the constant frequency carrier signal. The tape speed compensating signal in conductor 82 is a bias signal established by amplifier 86. The carrier signal in conductor 18 is applied to squaring circuit 36 to provide the square wave 37 shown in FIG. 3A.

Figures 3A, 3B, 3C, 3D, 3E, 3F, 3G:
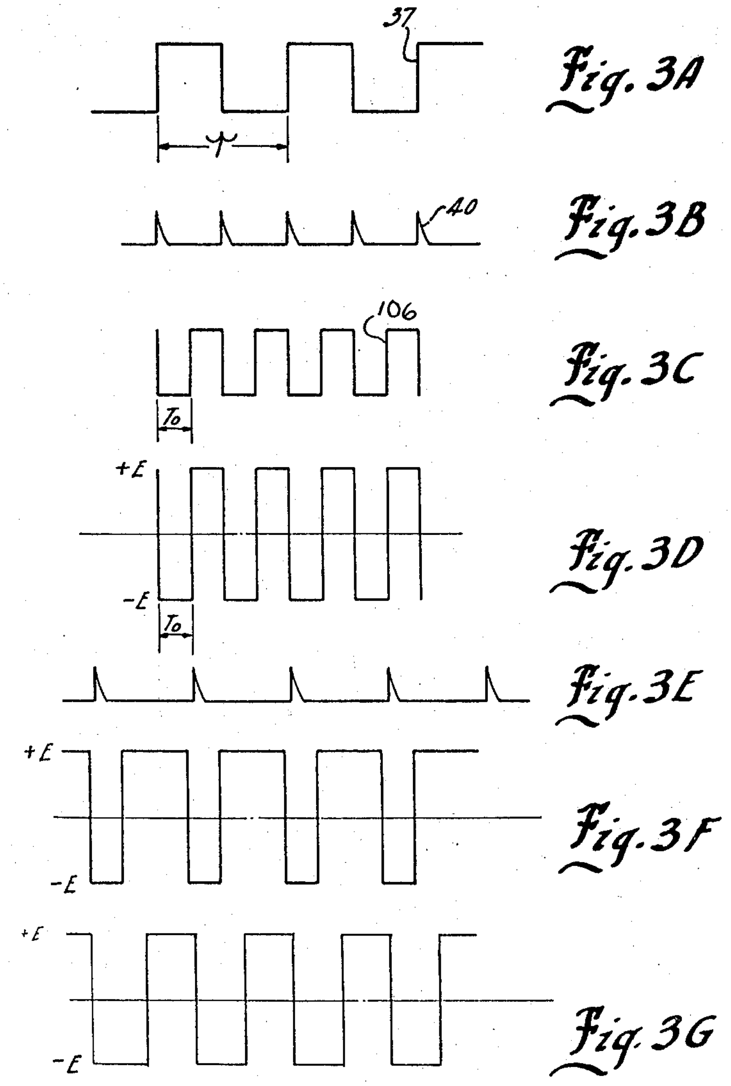
FIGS. 3A and 3G comprise electrical condition wave forms illustrating the operation of the tape speed compensation circuit of the present invention.

Square wave signal 37 is applied to differentiation circuit 38 to provide spike pulse train 40 comprised of a train of equally spaced pulses, as shown in FIG. 3B.

Prior to the application of the spike pulse train 40 to transistor 44, transistor 44 is non-conductive. Capacitor 52 has a charge on its right hand plate which renders transistor 54 conductive. There is no signal in conductor 60 and the output signal of one shot multivibrator 45 in conductor 62 is a voltage determined by the voltage divider comprised of resistors 48 and 50.

A pulse train 40 in conductor 42 is provided to the base of transistor 44 to turn this transistor on. This reduces the voltage at the collector of transistor 44, removing the voltage signal in conductor 62. The reduced voltage at the base of transistor 46 reduces the emitter voltage and the voltage on the left-hand plate of capacitor 52. Because of the constant voltage characteristics of capacitor 52, the right hand plate of capacitor 52 experiences a similar reduction in voltage which reduces the voltage at the base of transistor 54 below conduction, turning off transistor 54. The voltage at the collector of transistor 54 increases, due to its connection to conductor 72. The increased voltage at the collector of transistor 54 is provided to the base of transistor 44, via conductor 60, to retain transistor 44 in the conductive state and transistor 54 in the non conductive state.

Under these conditions, a flow path is created for the current of current source 91. The current flows from conductor 82 through potentiometer 104, resistor 102, the emitter-collector of transistor 94, capacitor 52, and the emitter-collector of transistor 46 to ground conductor 71. The current in this path charges capacitor 52 with a positive potential on the right hand plate. When the voltage on the right hand plate of capacitor 52 reaches the conduction level of transistor 54, the transistor is returned to the conductive state, reducing the voltage on the collector terminal of the transistor. The reduced voltage is applied through conductor 60 to the base of transistor 44 to return that transistor to a non-conductive state and restore the voltage signal in conductor 62. The turn off of transistor 44 returns the voltages of transistor 46, and thereafter the voltage of capacitor 52, to the original condition. This completes the operative period $T_o$ of the one shot multivibrator. The application of the next spike pulse of train 40 repeats the above described operation.

The cyclical operation of one shot multivibrator 45 thus includes an operative period $T_o$ in which no voltage signal appears in conductor 62 followed by an inoperative period during which a voltage signal appears in the conductor. The output of one shot multivibrator 45 in conductor 62 is the square wave signal 106 in FIG. 3C having twice the frequency of square wave signal 37 and having half the time interval of the time interval $\tau$ of the square wave signal 37.

It will be appreciated that the operative period $T_o$ of the one shot multivibrator is determined by the charging rate of capacitor 52 and the magnitude of the current from current source 91. Inasmuch as the voltage at the base of transistor 92 is fixed, the magnitude of the capacitor charging current is determined by the voltage signal in conductor 82 at the output of amplifier 86 and by the resistance of resistor 102 and potentiometer 104. In the instance where no data signal or flutter is present, this is the bias signal. The magnitude of the emitter-collector current of transistor 92 is adjusted by altering the resistance of potentiometer 104 so that, in the absence of the data signal or flutter effects, current source 91 provides a current sufficient to cause the operative and inoperative periods of one shot multivibrator 45 to occupy equal portions of the cycle, as shown in FIG. 3C.

The signal in conductor 62 is applied to the base of input transistor 64 of the push-pull driver. When a voltage signal is present in conductor 62, transistor 64 will be turned on, causing the turn on of transistor 66. The turn on of transistor 66 turns on transistor 74 causing a positive voltage +E to appear in conductor 78. When there is no signal in conductor 62, transistor 64 will be turned off. The bias in conductor 69 applied to the base of transistor 68 will turn that transistor on. This will turn on transistor 76 and supply a negative voltage −E to conductor 78. Due to the equality of the operative-inoperative periods of one shot multivibrator 45, the output signal in conductor 78 comprises equal periods of opposite voltage polarities, as shown in FIG. 3D. Because of the equality of the positive and negative voltage periods, filter 80 sees no net voltage and the output of data demodulator 26 in conductor 28 is zero.

The operation of the circuitry in the presence of flutter in the reproduced signals, but without compensation therefor, is as follows.

The flutter in the signal in conductor 18 appears as an alteration of the frequency of the signal in conductor 18. For example, if the flutter is produced by a slowing of the tape, the frequency of the signal in conductor 18 will be lessened. This will cause the spike pulses of train 40 in conductor 42 to be more widely spaced, as shown in FIG. 3E. The wider spacing of the spike pulses causes the interval between the triggering of the one shot multivibrator to be correspondingly greater. Without tape speed compensation, the operative period of the one shot multivibrator remains constant, even though the triggering interval increases, as the current from current source 91 remains unchanged. The operative period of one shot multivibrator 45 thus forms a relatively smaller portion of the multivibrator cycle.

Through the operation of the push-pull driver energized by the one shot multivibrator, the positive voltage polarity portion of the output signal in conductor 78 increases with respect to the negative voltage polarity portion of this output signal, as shown in FIG. 3F. This unbalanced voltage signal when filtered by filter 80 causes an output signal to appear in conductor 28. Inasmuch as there is no data signal at the input of data demodulator 26, this output signal is a false signal.

To provide tape speed compensation to data discriminator 26 to remove such false signals from the output, the tape speed compensation signal in conductor 24 and 82 is utilized. The flutter effect which appears in the reference signal in conductor 16 is demodulated in reference demodulator 20 in a manner not unlike that described in connection with data demodulator 26 and filtered by filter 22. A tape speed compensation signal corresponding to flutter is provided in conductor 24 and through amplifiers 84 and 86 to conductor 82. In the present instance in which the flutter effects have been caused by a slowing of tape 10, the tape speed compensation signal may be assumed to reduce the magnitude of the bias signal previously applied to current source 91. When the one shot multivibrator is triggered, transistor 54 is turned off thereafter the charging of capacitor 52 is commenced from current source 91 to return transistor 54 to the conductive state. However, the reduced signal in conductor 82 reduces the current from current source 91 and the rate at which capacitor 52 is charged. This lengthens the operative period of the one shot multivibrator. Specifically, the signal in conductor 82 lengthens the charging time of capacitor 52 and the operative period of one shot multivibrator 45 so that the operative period again occupies half of the cycle of the one shot multivibrator. The positive polarity voltage portion again equals the negative polarity voltage portion in the signal in conductor 78, even though the frequency of this signal has changed (See FIG. 3G) and no net voltage is therefore applied to filter 80. The output of data demodulator 26 returns to zero. The effects of flutter have thus been effectively removed.

A similar, but oppositely directed action occurs with the speed of tape 10 increases, to maintain the output signal of data demodulator 26 at zero.

Frequency variations in the signal in conductor 18 caused by the modulation of the frequency of the carrier by the recorded data also alter the time period of the one shot multivibrator. These variations are, of course, not subject to compensation and appear as the data signal in conductor 28 in the output of data demodulator 26.

It may be noted that filter 22 in the output of reference demodulator 20 introduces a time delay in the tape speed compensating signal in conductor 24. A delay circuit may be inserted in conductor 18 which provides a corresponding delay to the signal in conductor 18. The band width of filter 22 should be greater than the band width of the data in conductor 18.

Due to the linear relationship between current and flutter effects, highly satisfactory tape speed compensation is obtained with the circuitry of the present invention over a wide range of speed variations. When compared with the voltage compensation techniques presently in use, the current compensation technique of the present invention provides a 10 dB improvement.

The linear relationship between current and flutter effects and the establishment of certain current controlling voltage factors in data modulator 26 may be more fully understood by the following mathematical analysis. From FIG. 3D it is seen that the output produced by one shot multivibrator 45 in conductor 78 is at the negative supply voltage −E for the operative period of the one shot multivibrator ($T_o$) and at the positive supply of voltage +E for the remainder of the multivibrator cycle. It is also seen that a duration of a positive voltage period plus a negative voltage period is one half the duration or time interval $\tau$ of the input signal in conductor 18, as noted from the square wave 37 shown in FIG. 3A.

The average of the positive and negative voltage periods of the signal shown in FIG. 3D is the one shot multivibrator output voltage level in conductor 78 which may be expressed as $$E_o = -ET_o + E(1/2\tau - T_o) \tag{1}$$

where:

$E_o$ average output voltage in conductor 78
$T_o$ duration of multivibrator operative period
E supply voltages
$\tau$ time interval of input signal in conductor 18

This equation may be reduced to $$E_o = -E(4T_o/\tau - 1) \tag{2}$$

The time interval of the input signal is related to input frequency by $\tau = 1/F_i$ where $F_i$ is the input frequency in conductor 18. In the presence of flutter effects in the input signal in conductor 18, the signal frequency $F_i$ is varied such that the input frequency is $F_i = F_s\ (1 + \alpha)$ where $F_s$ is the data signal frequency and $\alpha$ is flutter percentage expressed as a decimal. Substituting the equation for $\tau$ and $F_i$ into Equation 2 produces an expression which relates the multivibrator output voltage to flutter effects.

$$E_o = -E[4T_oF_s(1+\alpha) - 1] \tag{5}$$

The effect of the circuitry of the present invention in providing compensation to the output voltage of one shot multivibrator 45 for further effects may be mathematically considered as follows. When transistor 44 of one shot multivibrator 45 is turned on by a pulse of spike pulse train 40, the change in the voltage at the base of transistor 54 is approximately the change between the voltage established by the voltage divider comprised of resistor 48 and resistor 50 when transistor 44 is off and the neutral voltage in conductor 67 obtained when transistor 44 is on. This voltage will be recovered by the charging of capacitor 52 from current source 91 over the operative period $T_o$ of one shot multivibrator 45. Expressed mathematically this is $$T_o = E_1C/i \tag{6}$$

where:
$E_1$ = voltage established by R 48–50 when Tr 44 is off $C$ = capacitance of capacitor 52
$i$ = current from current source 91

The current $i$ of current source 91 can be expressed as $$i = E_3 - E_2/R \tag{7}$$

where:
$E_3$ = voltage signal in conductor 82
$E_2$ = reference voltage established at base of Tr 92 by R 94–96
$R$ = combined resistance of R 102 and Pot 104

The voltage $E_3$ existing in conductor 82 is comprised of two components. One component is a bias signal $E_{3B}$ existing in the absence of flutter effects. The other component is the flutter component $E_{3F}$. Thus, the voltage $E_3$ in conductor 82 may be expressed as $E_3 = E_{3B} + E_{3F}$. The flutter component $E_{3F}$ is directly proportional to flutter percentage $\alpha$, $E_{3F} = K\alpha$, where $\alpha$ is the percentage flutter and $K$ is a constant including the gain of amplifier 86 and other factors determining flutter voltage scale.

The operative period of one shot multivibrator 45 may be expressed by substituting the above equations into Equation 6 resulting in $$T_o = E_1 CR/K\alpha + E_{3B} - E_2 \quad (8)$$

By establishing the bias voltage $E_2$ at the base of transistor 92 equal to one half the bias component $E_{3B}$ of the signal in conductor 82 ($E_2 = 1/2\, E_{3B}$) and by specifying that the constant associated with flutter percentage also equals one half the bias component of the voltage in conductor 82 the quantities in the denominator of Equation 8 may be expressed in terms of the bias component voltage, $E_{3B}$. Equation 8 can then be reduced to $$T_o = 2\, E_1\, CR/E_{3B}(1 + \alpha) \quad (9)$$

The necessary relationship between the fixed voltage at the base of transistor 92 and the bias component of the voltage signal in conductor 82 may be established by adjustment of the operating level of operational amplifier 86. The relationship between the constant $K$ and the bias component of the voltage signal in conductor 82 may be established by adjusting potentiometer 88.

With these relationships established, Equation 9 can be substituted into Equation 5 to illustrate the effect of current source charging of capacitor 52 in removing flutter effects from the output voltage $E_O$ of one shot multivibrator 45.

$$E_o = -E\, [8E_1CR\, F_s(1 + \alpha)/E_{3B}(1 + \alpha) - 1]$$

The cancellation and removal of flutter effects is evidenced by the presence of the quantity $(1 + \alpha)$ containing the percentage flutter $\alpha$ in both the numerator and denominator of the equation.

Various modes of carrying out the invention are contemplated as being within the scope of the following claims particularly pointing out and distinctly claiming the subject matter which is regarded as the invention.

I claim:

1. In a demodulator for a frequency modulated signal having a frequency component and a record speed variation induced flutter effects frequency component, improved circuitry for providing compensation for the flutter effects associated with the signal from an analog signal having a magnitude corresponding to flutter effects, said circuitry being couplable to sources of said signals and comprising:

a one shot multivibrator including an input for receiving the flutter affected frequency modulated signal, cyclical means coupled to said input and triggerable by the frequency characteristics of the frequency modulated signal into cycles having operative and inoperative periods, the durational relationship of which demodulates the frequency modulated signal and provides an output signal at the output of the one shot multivibrator, the average value of which is solely a function of the frequency characteristics of the frequency modulated signal, the relationship of said operative and inoperative periods being changed by the flutter effects, and a capacitor coupled to said cyclical means for determining the duration of one of the periods of the cyclical means by current responsive charge alteration; and a current source coupled to said capacitor for supplying a charge altering current to said capacitor, said current source having an input means for receiving said analog flutter effect signal for controlling the magnitude of the current and the rate of capacitor charge alteration in accordance with the magnitude of the analog flutter effect signal for changing the duration of one of the periods of the cyclical means to restore a desired durational relationship between the operative and inoperative periods and provide an output signal from the one shot multivibrator, the average value of which is solely a function of the data frequency component of the frequency modulated signal.

2. The circuitry according to claim 1 wherein said flutter effect signal is a voltage signal and wherein said current source has a flow path including said capacitor and a resistive means, said resistive means having one end coupled to said current source input means for receiving said flutter effect voltage signal and the other end coupled to means for providing a fixed voltage at said other end so that the current in said path is determined by the application of said flutter effect voltage to said resistive means.

3. The circuitry according to claim 2 wherein said flutter effect voltage signal includes a bias level component and a component related to flutter effect through a voltage scale constant and wherein said circuitry includes a first voltage adjustment means in said current source input means for establishing the voltage scale constant of the flutter effect component at a level equal to one half the bias level component and a second voltage adjustment means in said current source input means for establishing a relationship between the fixed voltage applied to the resistive means and the bias level component such that the former is one half the latter, the adjustments provided by said first and second voltage adjustment means changing the duration of one of the periods of the one shot multivibrator responsive to the flutter effect voltage signal to completely compensate for flutter effects.

4. The circuitry according to claim 2 wherein said means for providing a fixed voltage to the other end of said resistive means includes transistor means having a power circuit connected in said current path and a control circuit connected to a source of fixed voltage.

5. The circuitry according to claim 4 wherein said transistor means comprises a transistor having its base terminal connected to said source of fixed voltage and having its emitter-collector circuit in said current path.

6. The circuitry according to claim 4 wherein said source of fixed voltage comprises a voltage divider connected across a voltage supply.

7. The circuitry according to claim 2 wherein said resistive means is of variable resistance.

* * * * *

UNITED STATES PATENT OFFICE
CERTIFICATE OF CORRECTION

Patent No. 3,815,035 Dated June 4, 1974

Inventor(s) John H. Griffin

It is certified that error appears in the above-identified patent and that said Letters Patent are hereby corrected as shown below:

Col. 7 line 61 Delete "$E_o = -ET_o + E(1/2\tau - T_o)$" and substitute therefor $$E_o = \frac{-ET_o + E(1/2\tau - T_o)}{1/2\tau}$$

Col. 8 line 22 After "for" delete "further" and substitute therefor ---flutter---

Signed and sealed this 8th day of October 1974.

(SEAL)
Attest:

McCOY M. GIBSON JR.
Attesting Officer

C. MARSHALL DANN
Commissioner of Patents